3,269,855
METHOD OF PRODUCING AN AMYLACEOUS FILM UPON THE SURFACE OF A BASE MATERIAL

Geert Moes, Hoogezand, and Antonius Hendrik Zijderveld, Veendam, Netherlands, assignors to W. A. Scholten's Chemische Fabrieken N.V., Groningen, Netherlands, a corporation of the Netherlands
No Drawing. Filed May 31, 1962, Ser. No. 198,703
Claims priority, application Netherlands, June 6, 1961, 265,605
10 Claims. (Cl. 117—62.2)

The present invention relates to a method of producing a water resistant amylaceous film upon the surface of a base material, comprising, applying both an aqueous dispersion of a water soluble starch phosphate ester and an aqueous solution of a polyvalent metal salt, selected from the group consisting of water-soluble aluminum, chromic, ferric, zirconium and stannic salts, to said surface of said base, thus forming in situ an insoluble film and drying said base material. The invention also relates to the resulting coated material.

In this application the term starch is to be understood as including, in addition to native starch, also modified starches, such as thin boiling starches, dextrins, and cold swelling starches, as well as the components of starch and water soluble chemical starch derivatives such as ethers and esters. The starch may originate from various plants, e.g. corn, waxy maize, wheat, rice, tapioca, potato and sago starch. Starch-containing flours, such as wheat, rye and buckwheat flour, may also be used.

The term "starch phosphate ester," as used herein, means the ester of starch and orthophosphoric acid or a salt or acid salt thereof. Starch esters containing as little as 0.02 phosphate group per anhydroglucose unit (D.S. 0.02) are suitable for the purpose of the invention. The starch phosphate esters may, e.g., be obtained by heating starch with water soluble ortho, pyro, meta, or polyphosphates. It is also possible to use the phosphate esters obtained by heating starch, alkali metal orthophosphates and urea or by heating starch, a phosphoric acid or pyrophosphoric acid—if desired in admixture with other inorganic acids—and urea. The starch phosphate esters may be used in purified or impure condition. Both monoesters and diesters of phosphoric acid and starch are known. In the latter case a cross-linking of the starch molecules will occur, which may proceed to such an extent that the starch phosphate esters concerned become water insoluble; such starch phosphate esters are not suitable for the present purpose.

Salts of polyvalent metals capable of producing insoluble compounds with the starch phosphate esters are, for example, water soluble aluminum, chromic, ferric, zirconium, and stannic salts. We preferably use aluminum salts, such as aluminum sulphate, chloride, nitrate, formate or acetate. Besides the normal salts we may also use the water soluble basic salts and, in the case of sulphates, also double salts, the so-called alums.

The preferred method for making water resistant films consists in that the base material is first treated with a solution of the starch phosphate ester and then with a solution of the metal salt. If desired, the base material may be dried between the two treatments. The solution of the metal salt may also contain a hydrophobic substance in emulsified condition; in this case, in addition to a water resistant also a water repellent effect will be obtained. This result is, e.g., achieved by subjecting the base material to an after-treatment with a paraffin or polyethylene emulsion containing aluminum formate.

In another embodiment of the invention the two components which are to form the insoluble salt are applied to the base material in the form of one single alkaline or ammoniacal solution. In this embodiment use is made of the property of some water insoluble salts of polyvalent metals, not to form insoluble starch phosphates, in such media. When subsequently the alkaline reaction is removed by adding a dilute acid, or the ammonia is evaporated, the insoluble compound is formed in situ on the base material. This may be done by treating the same with a dilute acid.

The method according to the invention can be used for various purposes, e.g., for sizing and finishing textile materials; for thickening and fixing in textile printing; for producing water resistant adhesives; for surface sizing of paper; and for making washable wall paper or water resistant coated paper.

The method according to the invention has been found to be particularly suitable for the manufacture of water resistant coated paper. For the manufacture of coated paper, a major part of a finely divided mineral pigment must be bonded to the paper by means of a binding agent, e.g. on the basis of casein, soya-alpha-protein, synthetic polymers or starch. If the coated paper is to be printed in offset, so that the unprinted portions have to be moistened with water, the coating should be water resistant. In the case of an insufficient water resistance, the binding agent is apt to get softened. As a consequence of this the pigment will be partly taken up by the rubber cloth, so that poor prints are obtained and the machine must often be stopped for cleaning. One of the major drawbacks of the conventional binding agents on starch basis, such as starch modified with acid, oxidants or enzymes, dextrinized starch and starch ethers, is that these products do not allow of being made water resistant by a simple treatment, as contrasted to casein.

In the past various reactants have been added to products on starch basis, in order to make them more or less water resistant, e.g., urea formaldehyde resins, potassium pyroantimonate and chromium stearyl chloride. These substances actually render the starch water resistant to a certain extent, but the use of these known starch products also has some disadvantages. A binding agent for coating offset paper should not only easily be made water resistant but, should satisfy many other requirements, inter alia with respect to the water retention of the ready coating composition, the binding power of the binding agent, patterning on the coated paper, and the plasticity of the coating. The aforementioned combinations of conventional starch products with insolubilizing reactants are inadequate in one or more of these respects.

We have now found that our method is extremely suitable for the manufacture of water resistant coated paper, particularly when the starch phosphate esters obtained by heating starch, urea and orthophosphates or a phosphoric acid, are applied. We preferably use for this purpose starch phosphate esters having an apparent viscosity of 10–1200 centipoises, measured by means of a rotational viscosimeter at a rate of shear of 480 sec.$^{-1}$, using a 25% solution at 25° C. Not only are the rheological properties of the coating compositions prepared with such starch phosphate esters very favorable, but the water resistance which may be obtained is very good too, and the printing qualities of the coated paper are excellent.

The invention will be illustrated by the following examples, in which all proportions are indicated in parts by weight.

*Example 1*

Potato starch is heated for one hour at 125° C. in the presence of 6% phosphoric acid and 15% urea. The resultant phosphate ester of starch has a degree of substitution (D.S.) of 0.08. A 25% solution of this ester in water has an apparent viscosity of 761 centipoises at 25° C.

100 parts of the phosphate ester are dispersed in 400 parts of water by boiling. Starting from this dispersion and a suspension containing 500 parts of China clay and 1.5 parts of sodium hexametaphosphate, a coating composition having a dry solid content of 40% is prepared. This coating composition is applied to semisized wood free offset paper by means of a size press, by which the weight of the paper is increased by 8 g./m.$^2$. The somewhat moist paper thus obtained is subjected to an after-treatment with a 5% aluminum sulphate solution in a sizing press. After drying at a temperature of 110° C., the paper thus treated has a coating which has excellent print-receptive characteristics and is highly water resistant.

If, instead of the above-described starch phosphate ester a thin-boiling potato starch of a corresponding viscosity is used, then the coating is not water resistant.

*Example 2*

200 parts of potato starch are suspended in a solution of 39 parts of $NaH_2PO_4.2H_2O$ in 250 parts of water. After 10 minutes the suspension is filtered and the starch is dried in the air. Subsequently the dry starch is heated at 145° C. for 3 hours. The starch phosphate ester thus obtained has a D.S. of 0.11.

In a similar way as in Example 1 a coating composition containing 40% of dry solids and, calculated on the China clay, 20% of the starch phosphate ester is prepared. To the felt side of a fully sized offset paper, a coating is applied by means of a size press so as to produce an average dry weight increase of 9 g./m.$^2$. After drying the coating is subjected to an after-treatment with a 5% solution of a basic aluminum chloride. The water resistance of the coating thus obtained is determined with the so-called "wet finger test" and found to be almost 100%. The water resistance of a coating similarly prepared from an oxidized potato starch having the same viscosity, is, however, only 70%, which is insufficient.

*Example 3*

A dispersion, obtained by boiling 20 parts of the starch phosphate ester described in Example 1 in 60 parts of water, is added to a suspension of 585 parts of chalk in 355 parts of water. The mixture thus obtained is applied to a base for wall paper by means of a sizing press and the paper is dried. The resultant paper is subjected to an after-treatment with a 4% zirconium acetate solution in the sizing press. The water resistance is tested with a plynometer, an apparatus in which the treated paper is ten times mopped with a moist sponge. The very small amount of pigment that has been rubbed loose, proves that a good water resistance has been obtained.

*Example 4*

69 parts of $NaH_2PO_4.1H_2O$ are dissolved in 250 parts of water. To this solution 180 parts of thin-boiling corn starch are added and the resultant suspension is stirred for 10 minutes. The suspension is filtered and the starch is dried in the air. The dry starch is subsequently heated at a temperature of 130° C. in a vacuum drier for 3 hours. The D.S. of the ester thus obtained is 0.05. 15 parts of this starch phosphate ester are dissolved in 43.5 parts of water by heating at 85° C. for 20 minutes. The dispersion is added to a suspension of 125 parts of China clay in 62.5 parts of water in which 0.4 part of sodium hexametaphosphate is dissolved. The resultant coating composition is colored with various pigments and then mechanically applied to a base for wall paper.

Immediately after the coating composition has been applied a solution of aluminum formate is sprayed on to the paper by means of a spraying gun. After drying the paper is found to be entirely water resistant.

Similar results are obtained when for the after-treatment chromic or ferric chloride are used.

*Example 5*

By heating tapioca starch in the presence of 4% phosphoric acid, 1% sulphuric acid and 15% urea at 125° C. for 1 hour, a starch phosphate ester is obtained, with a D.S. of 0.09. This phosphate ester is boiled with water in a concentration of 10%, and with the dispersion thus obtained cotton gabardine is padded at 40° C. After drying at 100° C. the sized fabric is padded through a dilute paraffin emulsion containing 2.5% of paraffin and 1% of aluminum formate at 50° C. After drying at 100° C. the resultant fabric is water repellent and highly wash resistant.

*Example 6*

A starch phosphate ester, having a D.S. of 0.02 is obtained by heating a mixture of thin boiling corn starch and 5% sodium trimetaphosphate for 1 hour at a temperature of 125° C.

A 5% aqueous dispersion of this phosphate ester is applied to the surface of paper by means of a size press. The dried paper is then treated with a 2% aqueous stannic chloride solution, which is applied by means of a roller. After drying a water resistant surface-sized paper is obtained.

We claim:

1. A method of producing a water resistant amylaceous film upon the surface of paper, comprising applying an aqueous dispersion of a water soluble starch phosphate ester and an aqueous solution of a polyvalent metal salt, selected from the group consisting of water soluble aluminum, chromic, ferric, zirconium and stannic salts, to the surface of the said paper, thus forming an insoluble film in situ, and subsequently drying the paper.

2. A method according to claim 1, wherein the starch phosphate ester is obtained by heating starch, urea and a substance selected from the group consisting of alkali metal orthophosphates, phosphoric acid and pyrophosphoric acid.

3. A method according to claim 1, wherein the polyvalent metal salt is an aluminum salt.

4. A method according to claim 1, which comprises first treating the base material with the aqueous dispersion of the starch phosphate ester and subsequently subjecting it to treatment with the aqueous solution of the polyvalent metal salt.

5. A method according to claim 1, which comprises first treating the base material with the aqueous dispersion of the starch phosphate ester, drying the base material thus treated, and then subjecting it to treatment with the aqueous solution of the polyvalent metal salt.

6. A method according to claim 1, in which the aqueous dispersion of the water soluble starch phosphate ester and the aqueous solution of the polyvalent metal salt are simultaneously applied to the surface of the paper in the form of a mixture which has been rendered alkaline by the addition thereto of an alkali hydroxide, the insoluble compound being formed in situ by neutralizing the alkaline reaction.

7. A method according to claim 1, in which the aqueous dispersion of the water soluble starch phosphate ester and the aqueous solution of the polyvalent metal salt are simultaneously applied to the surface of the paper in a form of a mixture which has been rendered alkaline by the addition thereto of ammonia, the insoluble compound being formed in situ by evaporation of the ammonia.

8. A method of making a water resistant mineral coated paper comprising applying to the surface of a paper base an aqueous dispersion of a water soluble starch phosphate ester containing a major part of a finely divided mineral pigment and an aqueous solution of a polyvalent metal salt, selected from the group consisting of water soluble aluminum, chromic, ferric, zirconium and stannic salts and drying said coated paper base.

9. A method according to claim 8, wherein the starch phosphate ester has an apparent viscosity of 10–1200 centipoises, measured by means of a rotational viscosimeter at a rate of shear of 480 sec.$^{-1}$, using a 25% solution at 25° C.

10. Paper provided with a water resistant amylaceous film consisting of a water insoluble salt of a starch phosphate ester and a polyvalent metal ion, selected from the group consisting of aluminum, chromic, ferric, zirconium and stannic ions.

References Cited by the Examiner

UNITED STATES PATENTS

| | | | |
|---|---|---|---|
| 2,132,527 | 10/1938 | Caesar | 117—165 |
| 2,230,656 | 2/1941 | Scholler et al. | 106—212 |
| 2,565,686 | 8/1951 | Hill | 260—174 |
| 2,657,155 | 10/1953 | Lolkema | 117—165 |
| 2,993,041 | 7/1961 | Sietsema | 260—233.5 |
| 3,038,895 | 6/1962 | Rutenberg et al. | 260—233.5 |
| 3,069,411 | 12/1962 | Hjermstad | 260—233.5 |
| 3,081,199 | 3/1962 | Taylor | 117—156 |
| 3,093,504 | 6/1963 | Bode | 117—165 |
| 3,144,298 | 8/1964 | Hullinger et al. | 117—156 XR |

WILLIAM D. MARTIN, *Primary Examiner.*

R. D. NEVIUS, C. A. HAASE, T. G. DAVIS,
*Assistant Examiners.*